(No Model.) 4 Sheets—Sheet 1.

R. SOLANO.
POWER BRAKE.

No. 358,992. Patented Mar. 8, 1887.

WITNESSES:
INVENTOR
Ronaldo Solano
BY
Chas. W. Forbes
ATTORNEY (No Model.) 4 Sheets—Sheet 2.
R. SOLANO.
POWER BRAKE.
No. 358,992. Patented Mar. 8, 1887.
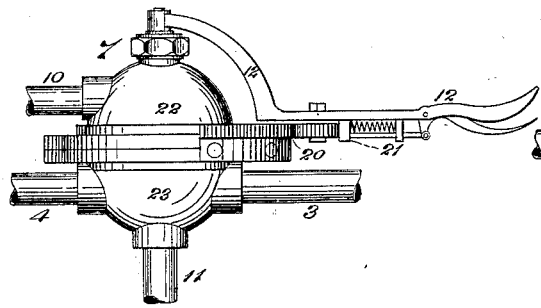
Fig. 2.
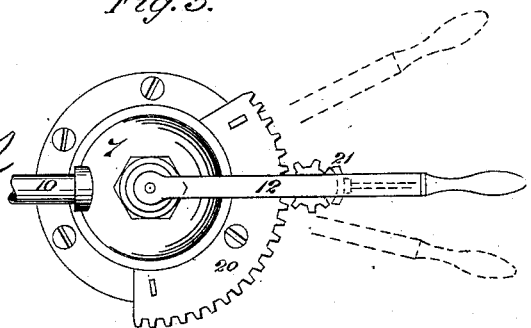
Fig. 3.
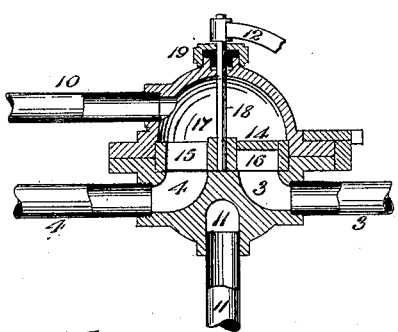
Fig. 4.
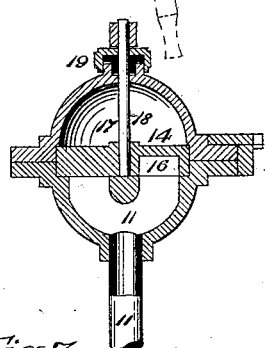
Fig. 5.
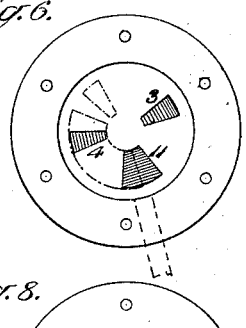
Fig. 6.
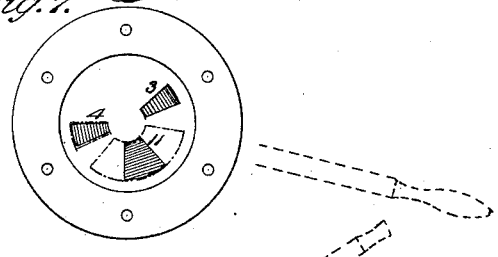
Fig. 7.
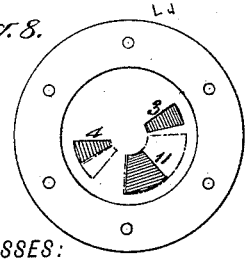
Fig. 8.
Fig. 9.
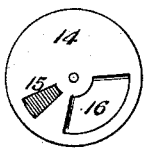
Fig. 10.
WITNESSES:
A. Greeley
W. W. Weston
INVENTOR
Rinaldo Solano
BY
Chas. N. Forbes
ATTORNEY (No Model.) 4 Sheets—Sheet 3.

R. SOLANO.
POWER BRAKE.

No. 358,992. Patented Mar. 8, 1887.

WITNESSES:

INVENTOR
Renaldo Solano
BY
Chas. W. Forbes
ATTORNEY (No Model.)  4 Sheets—Sheet 4.

R. SOLANO.
POWER BRAKE.

No. 358,992. Patented Mar. 8, 1887.

WITNESSES:
INVENTOR
Arnaldo Solano
BY
Chas. N. Forbes
ATTORNEY

UNITED STATES PATENT OFFICE.

RENALDO SOLANO, OF BROOKLYN, NEW YORK, ASSIGNOR OF TWO-THIRDS TO JOHN W. HOWARD AND DAVID R. MORSE, BOTH OF SAME PLACE.

POWER-BRAKE.

SPECIFICATION forming part of Letters Patent No. 358,992, dated March 8, 1887.

Application filed December 7, 1886. Serial No. 220,886. (No model.)

*To all whom it may concern:*

Be it known that I, RENALDO SOLANO, a citizen of the United States, residing at the city of Brooklyn, county of Kings, State of New York, have invented certain new and useful Improvements in Power-Brakes, of which the following is a specification.

This invention relates to improvements in systems and mechanism employed for operating the brakes of a railway-train and retarding the speed and stopping the momentum of the same by the agency of compressed air, the said system being universally controlled by the locomotive-engineer.

My improved system is, however, applicable to the employment of other pressure than that of air, as in the case of steam or hydraulic power brakes.

The object of my invention is, primarily, to effect a system by which the setting of the brakes from the forward portion of the train will take effect, commencing with the rear car and sequentially with each of the forward cars composing the train, the purpose being to obviate the objectionable feature of jostling incident to former systems of braking cars, especially in cases where a train is of considerable length; and my object is, secondarily, to simplify and improve the construction of the essential working parts of the apparatus; and to these ends my invention consists in a certain novel method of operation and arrangements of pipe-connections and valves and specific construction of certain parts, whereby these objects are attained; and in order that others skilled in the art to which my invention appertains may understand and use the same, I will proceed to describe the details of its construction, explain its operation, and point out in the appended claims its novel characteristics, having reference to the accompanying drawings, in which similar figures of reference indicate analogous parts throughout.

Figure 1:
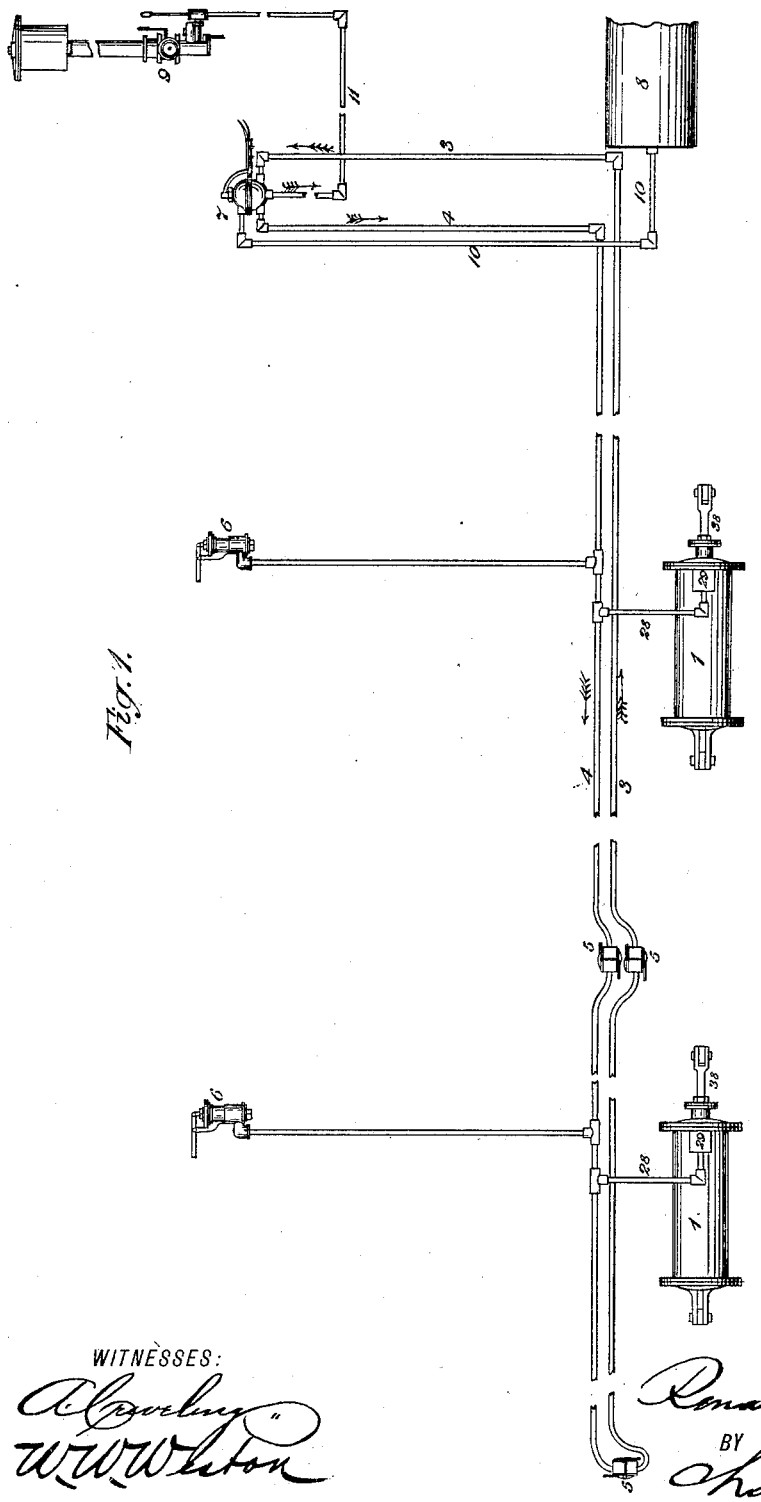
Figure 11:
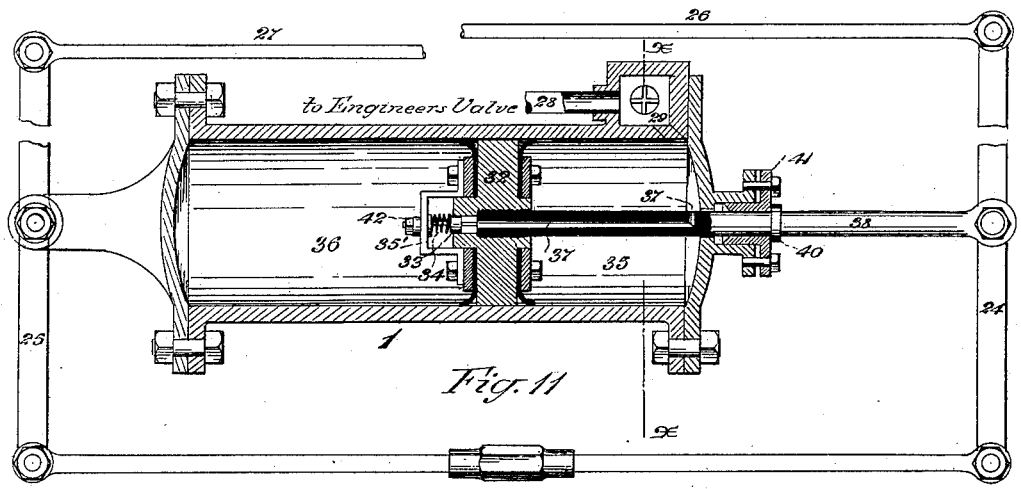
Figure 12:
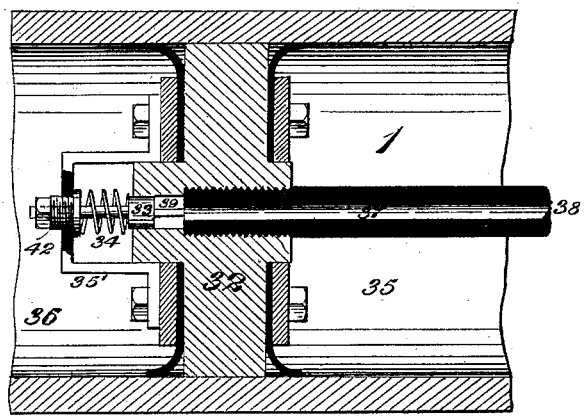
Figure 13:
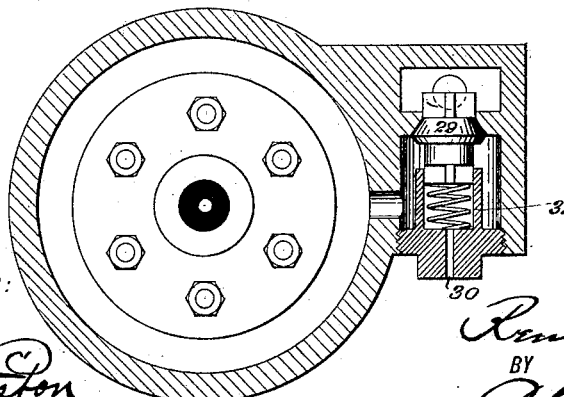
Figure 14:
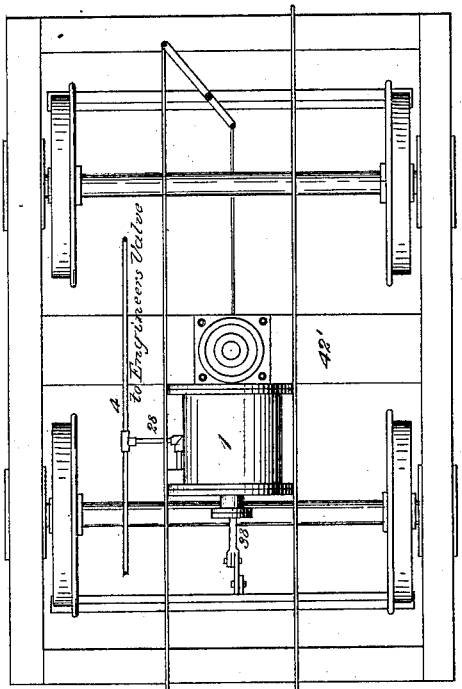
Figure 15:
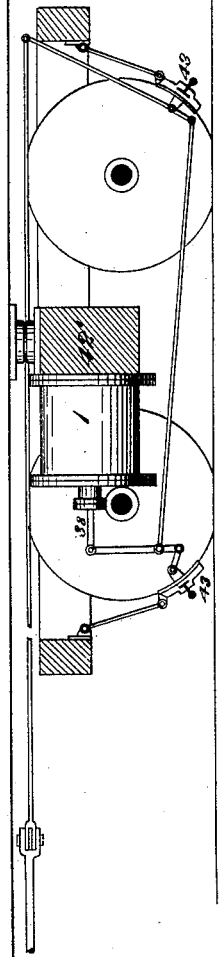

Figure 1 is a general diagram of my improved system as applied to compressed-air brakes; Fig. 2, an enlarged side view of the engineer's operating-valve; Fig. 3, a plan view, and Figs. 4 and 5 longitudinal and transverse sectional views, respectively, of the same. Figs. 6, 7, 8, 9 are plan views of the valve-seat of said operating-valve, the various positions of the latter with relation to the several ports being indicated by dotted lines, and Fig. 10 an inverted plan view of the valve. Fig. 11 is a longitudinal sectional view of one of the brake-actuating cylinders placed beneath each car; Fig. 12, an enlarged detail sectional view of the piston; Fig. 13, an enlarged transverse section of the cylinder on the line $x\ x$, Fig. 11. Figs. 14 and 15 are plan and longitudinal sectional views, respectively, illustrating the attachment of the actuating-cylinder to the truck of a car.

In the diagram, Fig. 1, the location of the parts illustrated upon the cars and locomotives composing a train are too well known to require specific illustration, the actuating-cylinders 1 1 being placed beneath the body of each car, and so connected with the usual brake-levers as to set the brakes when the piston-rods 38 of said cylinders are moved outward. The pipes 3 4, extending throughout the length of the train, are coupled between each car by the usual detachable pipe-couplings, 5, employed in such cases, the rear ends of the last pipe-sections being coupled to one another, for the purposes of my invention, so as to establish free communication between them at that point.

Upon each car, at any accessible point, are placed the conductor's relief-valves 6, communicating with the pipe 4 beneath the cars.

7 is the engineer's operating-valve, 8 the compressed-air reservoir, and 9 the ejector, all located in suitable positions upon the locomotive.

The operating-valve 7 opens communication between the relief-pipe 3 and exhaust-pipe 11 to the ejector when it is desired to set the brakes, and alternately opens communication between the charging-pipe 4 and supply-pipe 10 from the compressed-air reservoir 8 when it is desired to release said brakes, the construction of the cylinders 1 for effecting these functions being hereinafter more fully described.

The novel construction of the operating-valve 7 (shown in detail in Figs. 2 to 10, inclusive) consists of a circular disk-valve, 14, having a port, 15, extending through it, and a recess or channel, 16, in its under side or face, Fig. 10. Beneath the valve in its seat are located in convenient relation to the ports of the said valve the relief-port 3 of the pipe 3, the exhaust-port 11 of the pipe 11, and charging-port 4 of the pipe 4. Above the valve the pressure-pipe 10 communicates permanently with the valve-chamber 17, through which the valve-stem 18 extends, the latter being furnished with a packing-gland, 19, and rotated by means of the lever 12. The lever 12 is provided with a suitable segment and clamping device, 20 21. The valve-casing is composed of two parts, 22 23, bolted together, promoting simplicity of construction and ease of access to the parts.

The brake-cylinders 1, one of which, Fig. 11, is shown suspended between brake-levers 24 25, which, upon spreading, set the brakes by connection of the latter with the rods 26 27, are connected to the charging-pipes 28, having automatic relief-valves 29, which open said connection when the pressure within the charging-pipe exceeds that in the cylinder, and close the same when said pressure is withdrawn, allowing the exhaust-vent 30 to remain open, the spring 31 forcing the valve to its seat and exposing the passages of its webbed portion, opening communication, as shown in Fig. 13. The piston 32 of the cylinder is provided with a small automatic valve, 33, Fig. 12, having a spring, 34, of predetermined resisting power, regulated by the adjusting-bush 42, sufficient to hold it in place by a yoke, 35'. The valve 33 communicates with the chamber 35 of the cylinder by means of the port 37 in the piston-rod 38, and said valve is guided when forced out by means of its webbed portion 39, by which communication is established through the piston-rod when the port 37 communicates with the cylinder-chamber 35.

The piston-rod 38 is provided with a collar, 40, which acts as a stop and abuts against the gland 41 or other equivalent at the end of the cylinder, limiting the movement of said piston-rod to the present position when the brakes are released.

A corresponding arrangement of parts is employed in adapting the brake-cylinder 1 for direct attachment to a car-truck, as in Figs. 14 and 15, the cylinder being altered in its proportion to meet the requirements of a fixed position upon the beam 42' of the truck, and the lever-connections suitably adapted, as shown, to set the brakes 43 when the piston-rod 38 is forced out. In this instance the pipe 28, communicating to the cylinder, may be of flexible material, to allow for the various movements of the truck with relation to the car-body and pipe 4.

The normal released position of the brakes in the first instance of Fig. 1 is maintained by continuously holding the pistons 32, Fig. 11, in the position shown against the air-cushion in the chamber 36 back of the cylinder-pistons by means of the pressure of compressed air throughout the pipes 4 and 3, introduced from the reservoir 8, and there held by turning the disk 14 of the operating-valve 7 to the closed position shown by Fig. 8, in which the valve-ports (indicated by dotted lines) throw the several ports 3 4 11 in the valve-seat entirely out of communication with one another or with the supply-pipe 10.

In order to apply the brakes, the lever 12 and operating-valve are thrown to the position indicated by Fig. 9, whereby the compressed air in the pipes 3 and 4 is released, as indicated by arrows, Fig. 1, and through the channel 16 of the valve 14, being drawn thence by the ejector, which latter appliance, being put into simultaneous operation, accelerates the exhaustion. The escape of the air in the direction specified, through the pipe 3, causes the reduction of pressure to take effect first upon the cylinder or cylinders of the rear car, and subsequently upon each of the forward cars in consecutive order, causing the automatic valves 29, Fig. 13, to close to the position shown in said figure, allowing the confined air from the chamber 35 to escape around them and through the vent 30 to the atmosphere, whereupon the expansion of the compressed air in chamber 36 sets the brakes. In cases of necessity—as in the instance of failure to have coupled the pipes 3 and 4 at the rear—the engineer may set the operating-valve to the position indicated by Fig. 6, releasing the air directly from the pipe 4 to the ejector through port 11; but this emergency would obviously defeat the purpose of my system, setting the forward brakes of the train first. Furthermore, the brakes may be set throughout the train by opening any one of several relief-valves 6; or the event of breakage of any portion of the system of pipe-sections 3 4 or couplings 5, placing the train beyond the control of the engineer, will result in automatic braking.

In order to again release the brakes, the valve 14 is moved to the position indicated by Fig. 7, in which the compressed-air pipe 10 from the reservoir 8 is put into communication with the charging-pipe 4, releasing, first, the forward cars, forcing the valves 29, Fig. 13, down from their seats, returning the pistons to the position of Fig. 11, and passing around by the return-pipe 3 to the closed port 3 of the operating-valve, at which point the equalization of pressure is made apparent to the engineer by means of suitable pressure-gages placed in his view, connecting to each of the said pipes 3 and 4. The operating-valve is then returned to the position of Fig. 8.

During the charging operation the automatic valve 33, Figs. 11 and 12, is forced open, after the collar 40 of the piston-rod 38 has arrested the motion of the latter and the port 37 opened to the cylinder. In case the supply of compressed air in chamber 36 back of the piston should have become exhausted to any extent by leakage, thereby restoring the pressure at each operation, thus insuring the maintenance of the required compression, the appliance of the brakes is effected by admitting steam by the lever 50 to the ejector, whereupon the atmospheric pressure is reduced through the pipe 3, first in the rear cylinder, 1, and subsequently in each of the forward cylinders likewise.

Having thus fully described my invention, what I claim, and desire to secure by Letters Patent, is—

1. In a power-brake, the method, substantially as described, of actuating the power at the rear portion of a train by an engineer's operating-valve, so as to apply the brake sequentially from the rear with each of the forward cars, for the purpose specified.

2. In a compression air-brake system, substantially as described, the combination, with brake-actuating cylinders located upon the several cars composing a railway-train and sectional pipe connecting said cylinders to one another and to an operating-valve and compressed-air reservoir, of a sectional exhaust-pipe communicating at one end with said sectional cylinder-pipes at a point corresponding to the rear portion of said train, and connecting at its opposite end to the part of said operating-valve which controls the exhaust of the compressed air.

3. In a power-brake system having an actuating-cylinder charged at the forward end from its opposite end through the piston-rod, a hollow piston-rod having a communicating port and fitted with a check-valve, in the manner specified.

4. In a power-brake system, substantially as described, the combination, with an actuating-cylinder arranged upon each car, or upon its truck, of a relief-pipe communicating therewith sequentially from the rear portion of the train, whereby the brake is applied at the will of the operator, or automatically, in the event of rupture of said relief-pipe, as set forth.

5. In a power-brake system, substantially as described, the combination, with an actuating-cylinder arranged upon each car, or upon its truck, and connected with a relief-pipe communicating with each cylinder sequentially from the rear portion of the train and with the engineer's operating-valve, of an ejector for accelerating the exhaustion of the relief-pipe, as set forth.

RENALDO SOLANO.

Witnesses:
CHAS. W. FORBES,
WM. H. HANNA.